United States Patent Office 2,762,488
Patented Sept. 11, 1956

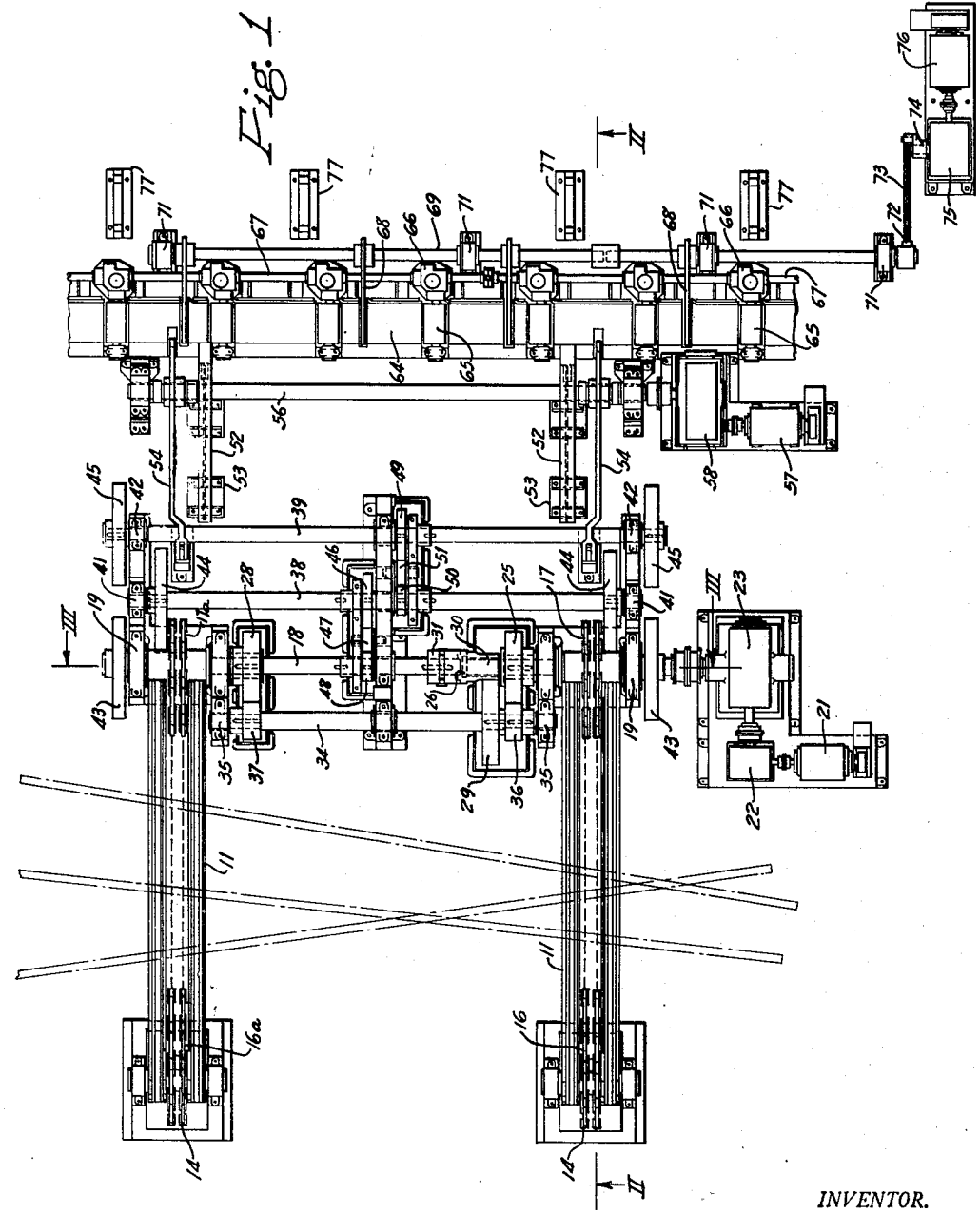

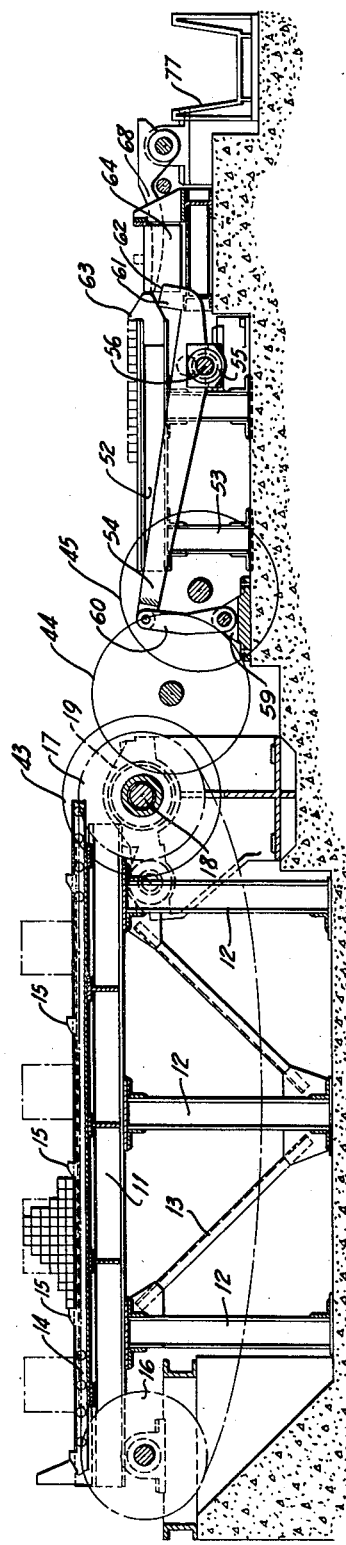

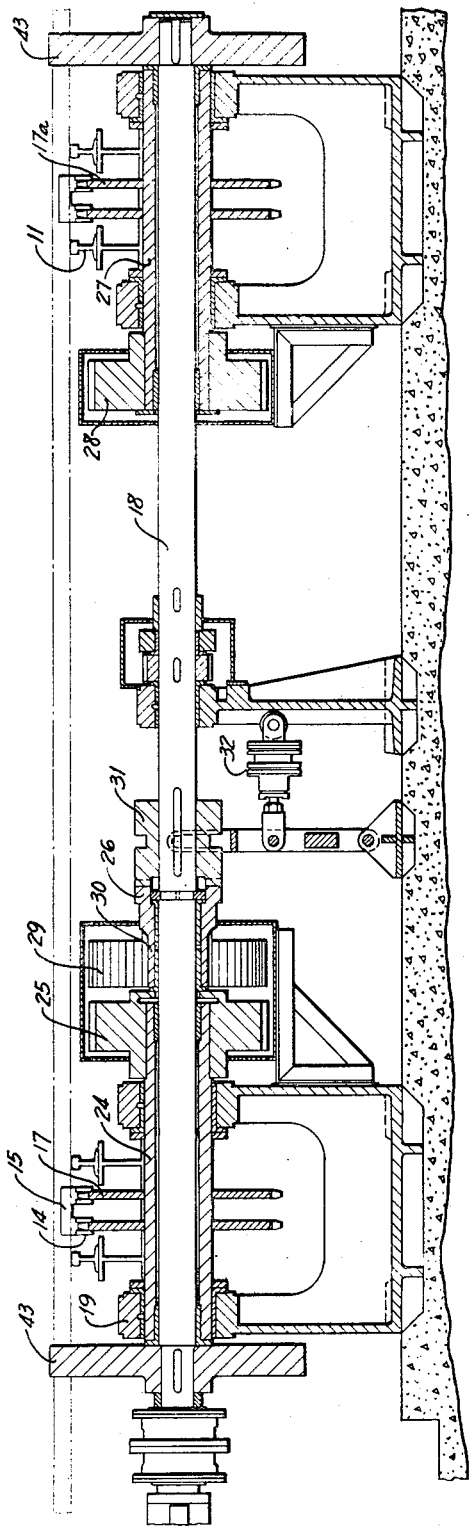

2,762,488
ARTICLE HANDLING AND TRANSFER APPARATUS

Norman C. Rendleman, Pittsburgh, Pa.

Application August 24, 1950, Serial No. 181,205

18 Claims. (Cl. 198—29)

This invention relates to handling equipment for use with rod and bar mills and the like, and, in particular, to apparatus for rearranging a scrambled mass of billets or the like into an orderly group to provide for the individual forwarding thereof to a furnace, for example, for reheating prior to further rolling operations.

Cold billets are by means of a sling deposited in groups or bundles upon a bed, skid or the like adjacent to the reheating furnace charging mechanism. However, the billets may become highly disarranged and scrambled when the sling is loosened so that the workmen must expend considerable effort in order to free and withdraw the billets singly therefrom as well as subject themselves to extreme dangers by reason of the possibility of some of the disarranged billets rolling or tumbling out of control.

In accordance with the invention herein disclosed, apparatus is provided for receiving billets which may be deposited thereon in a highly disorganized scrambled group; and, by means of a plurality of driven chains and transfer mechanisms is adapted to unscramble the billets and place them in such relationship with respect to one another so as to permit individual removal thereof from the group for disposition upon a table for delivery to the charging mechanism of a furnace. Included in the apparatus at the delivery side thereof, there is a plurality of arms which may be raised for removing refective billets from the table and depositing them in cradles for disposition.

One of the objects of this invention is to provide handling apparatus for receiving billets and bars in a scrambled state which is adapted to rearrange them in an orderly group from which they may be singly removed for further processing.

Another object of this invention is to provide apparatus adapted to receive billets in a scrambled group and by preliminary handling modify the arrangement whereby they are placed in side by side relationship.

Still another object of this invention is to provide rapidly and accurately operable handling apparatus adapted to unscramble and reorganize a group of billets, bars and the like.

A further object of this invention is to provide billet and bar handling apparatus which is simple of construction as well as economical to service and maintain.

The aforementioned objects, as well as the various other novel features and advantages of this invention, will be apparent from the following description and accompanying drawings of which;

Figure 1 is a plan view of billet and bar handling apparatus embodying the features of the invention herein disclosed, Figure 2 is a side elevation view of the apparatus taken at II—II of Figure 1 but illustrating in dot and dash lines bundles of billets which are arranged in orderly groups and a bundle shown in full lines which has become disarranged, and Figure 3 is a sectional view taken at III—III of Figure 1.

With reference to Figures 1, 2 and 3 of the drawings, the billet and bar handling and unscrambling apparatus includes a chain transfer upon which a bundle of elongated billets is deposited, and which comprises a pair of skids 11 resting upon a plurality of foundation posts 12 having reinforcing crossmembers 13 therebetween. A plurality of continuous transfer chains 14, having billet engaging lugs 15 projecting upward from some of the links thereof, pass along the skids and around idler sprockets 16 and 16a respectively journaled at the entry end and around driven sprockets 17 and 17a journaled at the delivery end of the skids 11. A shaft 18 upon which the sprockets 17 and 17a are rotated, is supported in suitable bearings 19 and is driven by an electrical motor 21 through two worm gear reduction units 22 and 23. The sprockets 17 are mounted upon a sleeve 24 which is freely rotatable upon the shaft 18. Also secured to the sleeve 24 there is a gear 25 and a clutch member 26. On the opposite end of the shaft 18 there is freely rotatably mounted thereon a sleeve 27 to which are secured the sprockets 17a and a gear 28. For engaging with the clutch member 26 there is a clutch 31 slidable along the shaft 18 and actuated by fluid motor 32 for placing the sleeve 24 in driving relationship with the shaft 18. The sleeve 27 is driven through a jack shaft 34 mounted in suitable bearings 35 and having pinions 36 and 37 which mesh with the gears 25 and 28 respectively. The jack shaft 34 is provided with a gear 29 which meshes with the teeth of a pinion 30 cut on the periphery of the clutch member 26.

At the discharge ends of the chain transfer (Figures 1 and 2), in addition to the shaft 18, two other shafts 38 and 39 are provided which are journaled in suitable bearings 41 and 42 respectively. Near the ends of the shafts 18, 38 and 39 there are secured sets of drums 43, 44 and 45 respectively. The shafts are so positioned with respect to one another that a plane passing through the axes of rotation thereof is depressed from the horizontal at an angle of approximately 15°.

Upon the central shaft 38 there is mounted a gear 46 which is driven by an idler gear 47 which meshes with the gear 46 and a gear 48 secured to the driven shaft 18. The gears are so proportioned that the central shaft is driven at one-half the speed of the shaft 18. The shaft 39, having a gear 49 mounted thereon, is driven from the central shaft 38 through a gear 50 mounted thereon and an idler gear 51 meshing with and positioned between the two gears. The ratio of the diameters of the gears is such that the shaft 39 is driven at one-half the speed of the central shaft 38. Thus, the speed of the drums 43, 44 and 45 is such that the drums 44 have one-half the peripheral speed of the drums 43 and the drums 45 have one-half the peripheral speed of the drums 44.

Adjacent to the shaft 39 (Figures 2 and 3) there are to horizontal longitudinally-extending skids 52 mounted upon supporting members 53. Alongside each skid 52 there is a reciprocatory beam 54 mounted upon an eccentric 55 rotated by a shaft 56 which is driven by an electrical motor 57 through a speed reduction unit 58. The forward ends of the beams 54 are pivotally supported by levers 60 rockably mounted in suitable brackets 59. The opposite ends of the beams 54 are provided with integral upwardly extending fingers 61 having a taper 62 for removing the billets as they reach the ends of the skids 52 and strike the tapered bumpers 63.

Next to the bumpers 63 there is a conveyor 64 having rolls 65 thereon which are driven through bevel gear units 66 by a suitable electrical motor or the like, not shown herein, through a shaft 67 to which the motor is connected. Spaced at intervals along the conveyor 64 and between the rolls 65 there is a plurality of tapered arms 68 which are keyed to a rock shaft 69 supported in suitable bearings 71. A lever 72 is secured to the shaft 69 and is pivoted to one end of a link 73, the link 73, at its opposite end, being pivotally mounted on a crank 74 driven through a speed reduction unit 75 by means of an electrical motor 76. A number of cradles 77 is spaced along and at a lower level than the conveyor 64 into which defective billets are deposited when removed from the conveyor 64 by the arms 68.

All of the various electrical motor controls are centrally located in a pulpit, preferably alongside the apparatus, so that the operator will have a clear view of the operations. Although none of the electrical switches and controls are illustrated or described, it is considered that since they are of the conventional type, the specific showing thereof is unnecessary.

The operation of the apparatus may be briefly summarized as follows:

Groups of billets are placed upon the device between the lugs 15 as shown in Figure 2, the chain and drum driving motor 21, the beam motor 57 and the conveyor motor energized and the clutch 31 engaged. The billets, when they are first placed upon the device, are usually in a disorganized scrambled state and move forward in that condition to the end of the skids 11. As they come in contact with the surface of the rotating drums 43 they are carried thereover and dropped into contact with the surface of the next drums 44. The drums 44, however, are rotating at one-half the speed of the drums 43. Thus, if the billet is canted as it comes in contact with the drums 43, one end will reach the second group of drums 44 before the other and due to the fact that the drums 44 are rotating at a slower rate, then the forward progress of the end first passing over the drums 43 will be retarded and the portion of the billet passing last over the drums will travel faster and hence begin to close the angle between the axis of the billet and a plane passed parallel to the axes of the drums. In a like manner the first portion of a billet to pass over the drums 44 and into contact with the drums 45 will be retarded in its forward progress and hence permit the trailing portion of the billet to move forward relatively faster. Thus the billets, while they are usually in a scrambled state when contact is first made with the drums 43, are soon, by the action of the drums 43, 44 and 45, substantially brought into line. From the drums 45, the billets are deposited upon the skids 52 and, by the action of the beams 54 which are operated by the rotating eccentrics 55, are, in step by step sequence, lifted and gradually moved forward in an arcuate manner until they strike the tapered bumpers 63. Any slight misalignment of the billets when they reach the skids 52 is quickly corrected as the billets move forward and come into contact with the bumpers or with billets previously deposited upon the skids. As the billets reach the bumpers 63, they are immediately removed from the skids by the upwardly extending lifting fingers 61, which describe a circular path, and deposited upon the conveyor and quickly carried to the reheating furnace charging mechanism. Of course, should an inspection of one of the billets, as it passes along the skids 52, prove it to be defective, when the billet reaches the conveyor 64, the motor thereof is stopped and the motor 76 energized to cause the arms 68 to lift the billet from the conveyor 64 and deposit it in the cradles 77 for disposition.

All of the billets of a group very readily pass from the skids 11 and onto the series of rotating drums inasmuch as stranding thereof at the ends of the skids is prevented by reason of the projection of the transfer chains 14 a substantial distance beyond the surface of the first drum 43. Should it become advisable to interrupt the forward movement of the chains at any time during the operation of the device and without stopping the rotation of the drum, it is merely necessary to withdraw the clutch 31 into its non-engaged position. In the event the billets reach the end of the skids 11 in an orderly group or bundle, the billets merely tumble upon the drums 43, 44 and 45 and become separated and placed in side by side relationship upon the skids 52 by both the action of the drums and the beam 54.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. Apparatus for rearranging in orderly fashion a group of elongated workpieces such as billets, bars or the like comprising transfer means upon which the workpieces are first placed substantially broadside, a plurality of driven rotary members for receiving said workpieces from said transfer means and so arranged that the axes of rotation of succeeding members are at a lower level and the workpiece contacting portions thereof traveling at a lesser speed than that of the members immediately preceding, means adjacent said rotary members for receiving and causing said workpieces in step by step sequence to be placed adjacent one another in a grouped relationship and for removing said workpieces from said group.

2. Apparatus for rearranging in orderly fashion a group of elongated workpieces such as billets, bars or the like comprising a driven conveyor upon which the workpieces are first placed substantially broadside, a plurality of driven rotary members for receiving and transferring said workpieces discharged by said conveyor and so arranged that the workpiece contacting portions thereof travel at a lesser speed than that of the members immediately preceding, additional means adjacent said rotary members for receiving said workpieces and causing them in step by step sequence to be placed adjacent one another in a grouped relationship and for removing said workpieces from said group.

3. Apparatus for rearranging in orderly fashion a group of elongated workpieces such as billets, bars or the like comprising a driven conveyor upon which the workpieces are first placed substantially broadside, a plurality of driven rotary drums for receiving and transferring said workpieces discharged by said conveyor and so arranged that their axes lie at a different level and the workpiece contacting portions thereof travel at a lesser speed than that of the drums immedaitely preceding, additional means adjacent said rotary members for receiving and causing said workpieces in step by step sequence to be placed adjacent one another in a grouped relationship and for removing said workpieces from said group.

4. Apparatus for rearranging in orderly fashion a group of elongated workpieces such as billets, bars or the like comprising a driven conveyor upon which the workpieces are first placed substantially broadside, a plurality of driven rotary drums for receiving and transferring said workpieces discharged by said conveyor and so arranged that their axes lie at a different level and the workpiece contacting portions thereof travel at a lesser speed than that of the drums immediately preceding, and means adjacent said drums for gathering said workpieces in a grouped relationship and for separating said workpieces therefrom.

5. Apparatus for rearranging in orderly fashion a group of elongated workpieces such as billets, bars and the like comprising transfer means upon which the workpieces are first placed substantially broadside, a plurality of driven rotary annular members adjacent to and adapted to receive workpieces from said transfer means and so arranged that the axes of rotation of succeeding members are at a different level and the workpiece contacting portions thereof travel at a lesser speed than that of the members immediately preceding, reciprocating means adjacent said rotary members for receiving and causing said workpieces in step by step sequence to be placed next to one another in a grouped relationship and for removing said workpieces from said group.

6. Apparatus for rearranging in orderly fashion a group of elongated workpieces such as billets, bars and the like comprising transfer means upon which the workpieces are first placed substantially broadside, a plurality of driven rotatable annular members for receiving and frictionally engaging said workpieces on discharge from said transfer means, said members being so arranged that the speed of the workpiece engaging surfaces of succeeding members is less than that of those preceding, means adjacent said members for receiving said workpieces delivered thereby and causing them in step by step sequence to be placed next to one another in a grouped relationship and for removing said workpieces from said group.

7. Apparatus for rearranging in orderly fashion a group of elongated workpieces such as billets, bars and the like comprising transfer means upon which the workpieces are first placed substantially broadside, a plurality of driven rotatable members for frictionally engaging said workpieces on discharge from said transfer means, said members being so arranged that the speed of the workpiece engaging surfaces of succeeding members is less than that of those preceding, reciprocatory means adjacent said members for receiving and causing workpieces delivered thereby in step by step sequence to be placed next to one another in a grouped relationship and for removing said workpieces from said group.

8. Apparatus for rearranging in orderly fashion a group of elongated workpieces such as billets, bars and the like comprising transfer means upon which the workpieces are first placed substantially broadside, a plurality of driven rotatable annular members for frictionally engaging said workpieces on delivery by said transfer means, said members being so arranged that the speed of the workpiece engaging surfaces of succeeding members is less than that of those preceding, means adjacent said members for receiving and causing said workpieces delivered thereby in step by step sequence to be placed next to one another in a grouped relationship for removing said workpieces from said group, and means for receiving said selected billets and advancing them in an axial direction.

9. Apparatus for rearranging in orderly fashion a group of elongated workpieces such as billets, bars or the like comprising transfer means upon which the workpieces are first placed substantially broadside, a plurality of driven rotary annular members for receiving workpieces delivered by said transfer means and so arranged that the axes of rotation of succeeding members are at a lower level and the workpiece contacting portions thereof traveling at a lesser speed than that of the members immediately preceding, and means adjacent said rotary members for receiving said workpieces.

10. Apparatus for rearranging in orderly fashion a group of elongated workpieces such as billets, bars or the like comprising transfer means upon which the workpieces are first placed substantially broadside, a plurality of driven rotary annular members for receiving workpieces delivered by said transfer means and so arranged that the axes of rotation of succeeding members are at a lower level and the workpiece contacting portions thereof traveling at a lesser speed than that of the members immediately preceding, means adjacent said rotary members for receiving workpieces therefrom, and means adapted to engage with and move said workpieces in step by step sequence adjacent one another in a grouped relationship.

11. Apparatus for rearranging in orderly fashion a group of elongated workpieces such as billets, bars or the like comprising transfer means upon which the workpieces are first placed substantially broadside, a plurality of driven rotary members for receiving workpieces delivered by said transfer means and so arranged that the axes of rotation of succeeding members are at a lower level and the workpiece contacting portions thereof traveling at a lesser speed than that of the members immediately preceding, and means adjacent said rotary members for receiving workpieces therefrom and causing them in step by step sequence to be placed adjacent one another in a grouped relationship.

12. Apparatus for rearranging in orderly fashion a group of elongated workpieces such as billets, bars or the like comprising a driven conveyor upon which the workpieces are placed substantially broadside for lateral movement to the discharge end thereof, a plurality of rotatable driven annular members adjacent the end of said conveyor adapted to engage frictionally between the ends thereof workpieces discharged thereby, succeeding rotatable driven annular members with the workpiece engaging peripheral surface thereof at a lower level and traveling at a lower rate of speed than the corresponding surface of the annular members immediately preceding, and a table having reciprocatory members pivotally mounted therebeneath adapted to receive and place in orderly fashion workpieces deposited thereon by said annular members.

13. Apparatus for rearranging in orderly fashion a group of elongated workpieces such as billets, bars or the like comprising a driven conveyor upon which the workpieces are placed substantially broadside for lateral movement to the discharge end thereof, a plurality of rotatable driven annular members adjacent the end of said conveyor adapted to engage frictionally between the ends thereof workpieces discharged thereby, succeeding rotatable driven annular members with the workpiece engaging peripheral surface thereof at a lower level and traveling at a lower rate of speed than the corresponding surface of the annular members immediately preceding, a table having reciprocatory members pivotally mounted therebeneath adapted to receive and place in orderly fashion workpieces deposited thereon by said annular members, and means for removing workpieces from said group.

14. Apparatus for rearranging in orderly fashion a group of elongated workpieces such as billets, bars or the like comprising a driven conveyor upon which the workpieces are placed substantially broadside for lateral movement to the discharge end thereof, a plurality of rotatable driven annular members adjacent the end of said conveyor adapted to engage frictionally between the ends thereof workpieces discharged thereby, succeeding rotatable driven annular members with the workpiece engaging peripheral surface thereof at a lower level and traveling at a lower rate of speed than the corresponding surface of the annular members immediately preceding, and a table for receiving workpieces delivered thereto by said annular members.

15. Apparatus for transporting from a position of storage elongated workpieces such as billets, bars and the like and rearranging them in orderly fashion comprising a conveyor upon which the workpieces are first placed in a bundle with their axes substantially transversely thereof, a drive for said conveyor, a plurality of rotatable annular members for frictionally engaging said workpieces discharged thereto by said conveyor arranged in succeeding groups with their axes parallel to each other and extending in a transverse direction with respect to said conveyor and in spaced vertical stepped relationship with respect to each other so that a plane passed tangent to the upper surfaces of one group is at a higher level than a plane passed tangent to the upper surfaces of the next succeeding group, a table, and driving means operatively engaged with and for so rotating said members that the speed of travel of the workpiece contacting surfaces of one group is in excess of that of the next succeeding group whereby workpieces received by said groups of annular members are aligned in parallel relationship with their axes extending transversely of said conveyor and delivered to said table.

16. Apparatus for transporting from a position of storage elongated workpieces such as billets, bars and the like and rearranging them in orderly fashion comprising a driven conveyor upon which the workpieces are first placed in a bundle with their axes substantially transversely thereof, a plurality of rotatable members for frictionally engaging said workpieces discharged thereto by said conveyor arranged in succeeding groups with their axes parallel to each other and extending in a transverse direction with respect to said conveyor and in spaced vertical stepped relationship with respect to each other so that the workpiece engaging surfaces of one group is at a higher level than the corresponding surfaces of the next succeeding group, a table, and driving means operatively engaged with and for so rotating said members that the speed of travel of the workpiece contacting surfaces of one group is in excess of that of the next succeeding group whereby workpieces received by said groups of members are aligned in parallel relationship with their axes extending transversely of said conveyor and delivered to said table.

17. Apparatus for transporting from a position of storage elongated workpieces such as billets, bars and the like and rearranging them in orderly fashion comprising a conveyor upon which the workpieces are first placed in a bundle with their axes substantially transversely thereof, a drive for said conveyor, a plurality of members for frictionally engaging said workpieces discharged thereto by said conveyor arranged in succeeding groups and in vertical stepped relationship with the workpiece engaging surfaces of one group at a higher level than the workpiece engaging surfaces of the next succeeding group, a table, and driving means operatively engaged with and for so actuating said members that the speed of travel of the workpiece contacting surfaces of one group is in excess of that of the next succeeding group whereby workpieces received by said groups of members are aligned in parallel relationship with their axes extending transversely of said conveyor and delivered to said table.

18. Apparatus for rearranging in orderly fashion a group of workpieces such as billets, bars or the like and including transfer means upon which the workpieces are placed substantially broadside, said apparatus comprising a plurality of driven rotary members for receiving on their surfaces workpieces delivered by said transfer means, said members being successively arranged that the points at which workpieces make contact with the surfaces of the next succeeding member are at a lower level and each workpiece contacting surface travels at a lesser speed than that of the member immediately preceding and means adjacent said rotary members for receiving said workpieces therefrom.

References Cited in the file of this patent

UNITED STATES PATENTS

| 1,497,438 | Gottschalk | June 10, 1924 |
| 1,658,531 | Male | Feb. 7, 1928 |

FOREIGN PATENTS

| 157,164 | Great Britain | Apr. 6, 1922 |